United States Patent
Weaver et al.

(10) Patent No.: US 10,271,308 B2
(45) Date of Patent: Apr. 23, 2019

(54) IMPLEMENTING THIRD GENERATION PARTNERSHIP PROJECT PROTOCOLS THAT COMBINE USE OF INTERNATIONAL MOBILE TELECOMMUNICATION BANDS AND NON-INTERNATIONAL MOBILE TELECOMMUNICATION BANDS OF LICENSED WIRELESS COMMUNICATION SPECTRUM

(75) Inventors: Geoff Weaver, Portland, OR (US); Carlos Cordeiro, Portland, OR (US); Srikathyayani Srikanteswara, Portland, OR (US); Bahareh Sadeghi, Portland, OR (US); Takashi Shono, Santa Clara, CA (US); Reza Arefi, Great Falls, VA (US); David Horne, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1035 days.

(21) Appl. No.: 13/997,072

(22) PCT Filed: Jun. 6, 2012

(86) PCT No.: PCT/US2012/041168
§ 371 (c)(1),
(2), (4) Date: Mar. 31, 2015

(87) PCT Pub. No.: WO2013/154599
PCT Pub. Date: Oct. 17, 2013

(65) Prior Publication Data
US 2015/0223072 A1 Aug. 6, 2015

Related U.S. Application Data
(60) Provisional application No. 61/603,261, filed on Apr. 11, 2012.

(51) Int. Cl.
*H04W 4/24* (2018.01)
*H04L 12/24* (2006.01)
(Continued)

(52) U.S. Cl.
CPC ......... *H04W 72/04* (2013.01); *H04L 41/0896* (2013.01); *H04W 4/24* (2013.01);
(Continued)

(58) Field of Classification Search
CPC .. H04L 41/0896; H04W 16/10; H04W 16/14; H04W 24/08; H04W 28/16; H04W 4/24;
(Continued)

(56) References Cited

U.S. PATENT DOCUMENTS 5,608,727 A * 3/1997 Perreault ................... H04J 1/12
370/462
7,269,151 B2 9/2007 Diener et al.
(Continued)

FOREIGN PATENT DOCUMENTS

| JP | 2011146755 A | 7/2011 |
| WO | 2000/056099 A1 | 9/2000 |

(Continued)

OTHER PUBLICATIONS

International Search Report and Written Opinion received for PCT Application No. PCT/US2012/035748, dated Feb. 13, 2013, 9 pages.
(Continued)

*Primary Examiner* — Jung H Park
(74) *Attorney, Agent, or Firm* — Patent Capital Group

(57) ABSTRACT

A system and method are provided to facilitate signaling between base stations controlled by alternate spectrum holders (ASH's) and individual multi-mode devices (MMD's) operating in communication with those base stations to indicate an ability to a global spectrum marketplace of an
(Continued)

ability of the base stations and/or the individual MMD's to support communication in both International Mobile Telecommunication (IMT) and non-IMT bands is support of a dynamic spectrum allocation scheme. The disclosed systems and methods may be based on a modification of the 3rd Generation Partnership Protocol (3GPP®) Long Term Evolution (LTE®) standard so that non-IMT licensed spectrum can be included in LTE® or LTE-Advanced® multi-band carrier aggregation.

29 Claims, 3 Drawing Sheets

(51) Int. Cl.
- H04W 16/10 (2009.01)
- H04W 16/14 (2009.01)
- H04W 24/08 (2009.01)
- H04W 28/16 (2009.01)
- H04W 72/04 (2009.01)
- H04W 72/12 (2009.01)
- H04W 74/00 (2009.01)
- H04W 76/10 (2018.01)
- H04W 88/06 (2009.01)

(52) U.S. Cl.
CPC .......... H04W 16/10 (2013.01); H04W 16/14 (2013.01); H04W 24/08 (2013.01); H04W 28/16 (2013.01); H04W 72/0486 (2013.01); H04W 72/0493 (2013.01); H04W 72/1257 (2013.01); H04W 74/002 (2013.01); H04W 76/10 (2018.02); H04W 88/06 (2013.01)

(58) Field of Classification Search
CPC ............. H04W 72/04; H04W 72/0486; H04W 72/0493; H04W 72/1257; H04W 74/002; H04W 76/02; H04W 88/06
See application file for complete search history.

(56) References Cited

U.S. PATENT DOCUMENTS

| | | | |
|---|---|---|---|
| 8,000,715 B2 | 8/2011 | Melpignano et al. | |
| 8,073,458 B2 | 12/2011 | Chang | |
| 2006/0083205 A1 | 4/2006 | Buddhikot et al. | |
| 2007/0149187 A1 | 6/2007 | Levy | |
| 2008/0108365 A1* | 5/2008 | Buddhikot | H04W 16/10 455/452.1 |
| 2008/0117869 A1* | 5/2008 | Freen | H04W 28/16 370/329 |
| 2008/0222019 A1* | 9/2008 | Stanforth | G06Q 10/063 705/37 |
| 2008/0222021 A1 | 9/2008 | Stanforth et al. | |
| 2009/0022405 A1 | 1/2009 | Griffin | |
| 2010/0135226 A1 | 6/2010 | Chandramouli et al. | |
| 2010/0142454 A1* | 6/2010 | Chang | H04W 16/06 370/329 |
| 2010/0145745 A1 | 6/2010 | Stanforth et al. | |
| 2010/0145862 A1* | 6/2010 | Chang | G06Q 30/08 705/80 |
| 2010/0238868 A1* | 9/2010 | Melpignano | H04W 16/14 370/329 |
| 2010/0279680 A1 | 11/2010 | Reudink | |
| 2010/0325551 A1 | 12/2010 | Lauwers et al. | |
| 2011/0077042 A1 | 3/2011 | Stanforth et al. | |
| 2011/0090853 A1* | 4/2011 | Chandramouli | H04W 28/10 370/329 |
| 2011/0205984 A1* | 8/2011 | Lee | H04B 1/0053 370/329 |
| 2011/0222457 A1* | 9/2011 | Lee | H04W 28/06 370/312 |
| 2012/0014332 A1* | 1/2012 | Smith | H04W 16/14 370/329 |
| 2012/0196528 A1* | 8/2012 | Kazmi | H04W 52/365 455/9 |
| 2012/0289236 A1* | 11/2012 | Xu | H04W 16/14 455/446 |
| 2013/0010720 A1* | 1/2013 | Lohr | H04L 1/0026 370/329 |
| 2013/0142129 A1* | 6/2013 | Rinne | H04W 24/00 370/329 |
| 2015/0181601 A1* | 6/2015 | Schmidt | H04W 12/08 370/329 |

FOREIGN PATENT DOCUMENTS

| | | |
|---|---|---|
| WO | 2007/031958 A2 | 3/2007 |
| WO | 2013/126087 A1 | 8/2013 |

OTHER PUBLICATIONS

International Search Report and Written Opinion received for PCT Patent Application No. PCT/US2012/035760, dated Jan. 24, 2013, 9 pages.

International Search Report and Written Opinion received for PCT Patent Application No. PCT/US2012/035780, dated Feb. 25, 2013, 10 pages.

International Search Report and Written Opinion received for PCT Application No. PCT/US2012/041167, dated Jan. 2, 2013, 12 pages.

International Search Report and Written Opinion received for PCT Patent Application No. PCT/US2012/041168, dated Feb. 1, 2013, 9 pages.

International Search Report and Written Opinion received for PCT Patent Application No. PCT/US2012/041169, dated Feb. 27, 2013, 9 pages.

* cited by examiner

IMPLEMENTING THIRD GENERATION PARTNERSHIP PROJECT PROTOCOLS THAT COMBINE USE OF INTERNATIONAL MOBILE TELECOMMUNICATION BANDS AND NON-INTERNATIONAL MOBILE TELECOMMUNICATION BANDS OF LICENSED WIRELESS COMMUNICATION SPECTRUM

CROSS REFERENCE TO RELATED APPLICATIONS

This Application is a national stage application under 35 U.S.C. § 371 of PCT International Application Serial No. PCT/US2012/041168, filed on Jun. 6, 2012 and entitled IMPLEMENTING THRD GENERATION PARTNERSHIP PROJECT PROTOCOLS THAT COMBINE USE OF INTERNATIONAL MOBILE TELECOMMUNICATION BANDS AND NON-INTERNATIONAL MOBILE TELECOMMUNICATION BANDS OF LICENSED WIRELESS COMMUNICATOIN SPECTRUM, which application claims the benefit of priority to U.S. Provisional Patent Application Ser. No. 61/603,261 filed on Apr. 11, 2012 and entitled INTELLIGENT SPECTRUM ALLOCATION BASED ON USER BEHAVIOR PATTERNS FOR EFFICIENT SPECTRUM USAGE. This application is related to co-pending U.S. Patent Application Nos. PCT/US2012/035780, PCT/US2012/035760 and PCT/US2012/035748, filed Apr. 30, 2012, the disclosures which are hereby incorporated by reference herein in their entirety.

BACKGROUND

1. Field of the Disclosed Embodiments

This disclosure relates to systems and methods to facilitate spectrum management for wireless networks that may employ spectrum allocated by primary spectrum holders (PSH's), or proxies assigned to manage a given allocations of spectrum, to temporarily "rent" access to the spectrum held by PSH's to other entities such as, for example, operators of mobile wireless networks, by integrating use of both International Mobile Telecommunication (IMT) bands and non-IMT bands in wireless multi-mode devices (MMD's).

2. Related Art

The last decade and a half has witnessed an explosion in growth in the use of, and requirements for, wireless data communications, particularly by individual users operating, for example, through exclusively-licensed wireless network operators. This growth continues unabated today as the numbers and types of wireless devices employed by individual users to access all manner of wireless networks via various communication paths continue to multiply, increasing demand for available spectrum. As the increase in demand for wireless data access continues, the world is headed toward a global spectrum shortage. There is a finite amount of spectrum that can be tapped to support wireless data communication. Availability of wireless spectrum for the increasing numbers and types of wireless devices is key to the continued use of the spectrum to exchange data, and to continued economic growth.

An availability of ever increasingly-capable wireless data communications has also created in individual users an expectation of a certain quality of service. In short, individual wireless data communication consumers, for example, expect quality wireless data and voice communications to be available anytime and anyplace. If solutions are not found, users of certain MMD's will frustratingly experience increased instances of dropped calls and slow data speeds all while paying higher fees to access the scarce resource that will be the wireless voice and data communication spectrum.

Wireless MMD's are used to provide individual customers virtually instantaneous and continuous wireless access to email, social media, applications and streaming video. These MMD's are currently estimated to use 25 to 125 times the amount of spectrum that was used by earlier generation cellular telephones. Various industry estimates expect growth in global mobile data traffic to double every 1-2 years for the foreseeable future.

Exclusive mobile spectrum licenses carve out to their licensees portions of the available spectrum that are used for wireless data and voice communication. Licensees in any geographic area include government agencies, which sometimes reserve communication spectrum to certain "required" wireless voice and data communications. A non-exhaustive list of these communications users includes broadcast radio and television communications, satellite communications, public safety and emergency services communications, military communications, and certain other commercial communication requirements to include, for example, communications with aircraft for navigation and air traffic control. Licensees in particular geographic areas also include wireless network operators such as, for example, mobile cellular network operators. A cursory review of a breakdown of the licensed spectrum for any particular geographic area reveals that the availability of new spectrum to support assignment of additional exclusive licenses to any particular licensee is nearly exhausted.

A detailed review of the challenges faced by mobile cellular network operators as an example starts with an overview of their operations. Mobile cellular network operators license spectrum bands for their exclusive use within a particular geographic region. These entities then contract with individual customers purchasing or being provided with network-connected MMD's to provide certain levels of service with express or implied guarantees of connectivity, and of communications fidelity at increasing rates of delivery. As mobile cellular network communication traffic continues its dramatic increase, congestion occurs today and the congestion is forecast to rise significantly in coming years in the portions of the spectrum currently licensed to mobile cellular network operators to support wireless voice and data communications.

In the face of current and forecast issues regarding network congestion in their licensed spectrums, wireless network operators have taken to purchasing additional exclusive spectrum licenses in the secondary market from other exclusive licensees (spectrum holders) whose licensed spectrum is underused or otherwise available. Buying additional spectrum licenses allows wireless network operators to build or expand their networks and handle more customer traffic. In fact, in late 2011, one major mobile cellular network operator in the U.S. reached an agreement, subject to regulatory approval, to buy a license for a small swath of wireless communication spectrum (around 20 MHz) from several broadcast cable companies for an amount that was reported to be in excess of three and one half billion dollars.

Efforts are ongoing to optimize wireless data communication to make more effective use of available spectrum. Consider the available spectrum as a pipe with a finite maximum diameter. Ongoing efforts attempt to optimize the flow of data through that pipe, thereby reducing the amount of spectrum used. These efforts include use of compression techniques, video optimization and burst transmissions such that overall data transmission through the pipe is streamlined and optimized, i.e., techniques are implemented to pass larger amounts of data in what appears to be a smaller volume of flow through the pipe. Additional efforts are focused on concepts such as Wi-Fi offload or small cell development to ease the burden on the saturated portions of the spectrum exclusively licensed to mobile cellular network operators. All efforts at making data flow more efficient, thereby improving spectral efficiency, will reap benefits. Regardless of these efforts, however, the pipe will never get any bigger due to the fixed, finite spectrum covered by licenses. The above efforts may delay the inevitable. There will still come a time, however, when currently-licensed portions of the spectrum that support mobile voice and data communications will be overburdened. When this overburdening occurs, a mobile cellular network operator has at its disposal methods, some of which are used today, by which to maintain service across its exclusively-licensed spectrum for all of its individual customer MMD's. Often these methods reduce the quality of service experienced by individual customers. Common techniques include, for example, mobile cellular network operators "throttling" rates at which data may be received by individual customers'MMD's. As with any supply and demand scheme, a wireless network operator can exact a premium from certain of its individual customers according to currently-licensed spectrum for its use to prioritize which individual customers get "throttled" last.

SUMMARY OF DISCLOSED EMBODIMENTS

A review of use of certain of the above-discussed licensed spectrums, other than those licensed to mobile cellular network operators, reveals that, although allocated to a specific entity for use at particularly scheduled times or on an as-needed basis, an overall rate of use of certain licensees' spectrum may actually be very low. The spectrum that is allocated to certain services, other than voice and data communication and Wi-Fi services, may experience actual overall average use rates as low as 1%. For example, some entities only require high use of their spectrum in times of emergency. Theoretically, across the wireless spectrum, up to an estimated 4 GHz of spectrum is underused.

One industry solution that has been suggested would be to allow individual MMD's to conduct autonomous spectrum sensing to detect unused spectrum and to tap into that spectrum for individual MMD's to use on an ad hoc basis. This "open market" or "opportunistic" method, which allows the individual customer to seek out and use the most effective and economical service regardless of how that service is delivered to the individual customer's MMD, is not according to the current paradigm. This method appears, according to current technology, to pose a level of chaos that will not solve the problem in a disciplined enough manner to be viable. Often, spectrum holders whose spectrum may be accessed require full control of their spectrum at certain times without interference from encroaching MMD's. The spectrum sensing solution would disrupt such control and introduce interference. There may come a time when an open market method may be feasibly implemented. At that time, the systems and methods according to this disclosure may be implemented directly with individual MMD's.

Some have suggested that the allocation of spectrum should implement utility models based on fairness, content type, and differences in providers. This suggested solution is largely discounted as it is postulated to create fragmentation and lead to inefficiencies that would only exacerbate the currently-forecast difficulties. Others have suggested using cognitive pilot channels (wireless spectrum) to advertise available unused or underused spectrum. This "solution," however, would require use of additional spectrum to implement the advertising and would be largely uncontrolled leading to increased chaos. Use of static databases to locate unused spectrum has also been proposed, but is not considered dynamic enough to manage the problem longer term. Spectrum required by individual users for any given period in any given location is dynamically changing, particularly when the users are mobile. This calls for an equally dynamic automated solution by which to manage spectrum allocation. The problems of overcrowding in certain portions of the spectrum can be alleviated by executing a disciplined scheme to tap into the underused portions of the spectrum in a manner that meets the requirements of all of the respective licensees.

In contrast to the open market method described above is a "controlled market" method. The controlled market method is based on the mobile cellular network operator/individual customer model in place today. An individual customer does not generally access spectrum except through the licensed spectrum controlled by the mobile cellular network operator that provides the service and equipment (MMD) to the individual customer. It is in this model that the mobile cellular network operator provides a contracted-for level of service with certain guarantees and disclaimers, while exercising some level of control. For example, based on this relationship, the mobile cellular network operator can throttle an individual customer's access to wireless communications by slowing the rate at which those communications are provided to the individual customer's MMD. The mobile cellular network operator could also block data transmissions from reaching the individual customer's MMD. The mobile cellular network operator can also control what applications individual customers may be able to access, and what applications the individual customers'MMD's may support. Because the controlled market method is the method generally in place today, the balance of this disclosure will appear to make reference to implementation of the disclosed systems and methods in a controlled market. It should be recognized, however, that the systems and methods according to this disclosure, as indicated above, may be equally enabled in an open market method, if an open market method becomes the paradigm for supporting individual customers' wireless communication needs. Also, the term mobile cellular network operator is used to generically refer to any commercial provider that exclusively licenses spectrum in support of providing wireless data and voice communications to a number of individual users on a for-fee basis.

Based on the above shortfalls, a new paradigm is emerging for global spectrum optimization in a controlled environment. New to the wireless industry is a discussion of temporary spectrum license rental/leasing, as opposed to spectrum license sale. This rental/leasing of temporary access to spectrum availability may be undertaken via auction or secondary market transactions. Exclusive licensees of unused or underused spectrum, referred to here as PSH's may provide an amount of spectrum at a particular time, in a particular location, and in a particular frequency band, to the marketplace in which licensees that require additional spectrum may acquire temporary access to the offered spectrum for a monetary fee or other appropriate consideration. There is a worldwide push for regulations that allow licensed spectrum holders to temporarily transfer, e.g.

rent or lease, access to their unused or underused spectrum to other entities requiring spectrum such as mobile cellular network operators. This creates a win-win situation where the other entities gain access to additional spectrum resources, which would not otherwise be available, while the PSH's with unused spectrum get a financial incentive or other consideration. This may be particularly attractive to the large majority of licensed spectrum holders whose use of their spectrum is well less than 100%, but that are not able to relinquish the spectrum completely through sale or other transaction based on their need to keep the spectrum reserved to their own use in certain areas at certain times.

According to proposed schemes, multiple PSH's having underused spectrum may act as spectrum suppliers. Multiple alternate spectrum holders (ASH's), such as, for example, mobile cellular network operators, may seek to augment their own exclusively-licensed spectrum by obtaining additional spectrum availability from the spectrum suppliers as, for example, spectrum renters. The mobile cellular network operator needs to support its individual customers operating its individual MMD's connected to the mobile cellular network. The mobile cellular network operator is in a position to monitor the use of its network by its individual customers according to time and location. When the mobile cellular network operator determines that its licensed spectrum will not meet customer demand for a particular location at a particular time, e.g., busiest periods of the day, the mobile cellular network operator, acting as an ASH, may execute a transaction such as, for example, placing a real-time bid for spectrum, to temporarily acquire additional spectrum in a particular location at a particular time that has been made available by a PSH in a controlled marketplace.

Prior to offering portions of its underused spectrum to the marketplace for access by potential ASH's, the PSH generally needs to be assured that it can regain control of its spectrum when a need arises. A clear mechanism to support such assurances is provided in the exemplary embodiments discussed in this disclosure. As discussed in this disclosure, DSA generally refers to a scheme that allows PSH's to temporarily rent their spectrum to ASH's on the condition that the rented spectrum can be reclaimed by the PSH on demand. It is estimated that, through implementation of such a scheme across all spectrum to 6 GHz, as much as 75% of the underused 4 GHz of spectrum may be recovered for use by multiple ASH's. This complete recovery would require full implementation of a brokering scheme and full cooperation from all PSH's. Actual implementation may initially realize a recovery of spectrum at well less than 2 GHz as it is anticipated that certain PSH's may choose not to participate, and others may temper their participation. To put the above numbers in some perspective, however, it should be realized that a 500 MHz recovery would effectively double the amount of spectrum currently available for mobile cellular network communications.

A challenge in achieving an efficient and scalable DSA scheme that becomes economically viable is effective spectrum management. In other words, given the temporary lease of spectrum to different operators or users, in different locations, for different time periods, a challenge resides in determining how best to coordinate the lease of the spectrum so that the brokering scheme maximizes: (1) the incentive for ASH's; (2) the incentive for PSH's and (3) experience for the user/operator that is paying for that spectrum (ideally, with minimal cost), all while avoiding interference and assuring the PSH that its spectrum is recoverable on demand. This is an optimization problem that lends itself to use of computational analytics. Currently, there are no known global spectrum management schemes with computational analytics across networks employing DSA. While wireless network operators make use of spectrum management within their own networks, there is no cross-network, or cross-operator, spectrum management between potential ASH's. Today, with spectrum exclusively licensed, there has been no push for large scale spectrum management. However, with future spectrum exhaustion of their exclusively-licensed spectrum expected by carriers, the larger pool of rented spectrum provides a greater pool of spectrum resources from which to optimize utilization, i.e., optimization would no longer be limited to just the local spectrum resources of each individual carrier.

An overarching CSS approach to realizing a form of DSA centered on the cloud is proposed in U.S. Provisional Patent Application No. 61/603,261. Specifically, the cloud is envisioned as the mechanism to enable management, in real-time or in near real-time, of the dynamic allocation, reclaiming, de-allocation, auditing, and optimizing the use of spectrum that has been the subject of a transaction between PSH's and operators/users/content providers acting as ASH's.

Application No. PCT/US2012/035780 proposes a two-level spectrum management analytic optimization that effectively bifurcates spectrum optimization requirements and responsibilities between a regional global spectrum broker and local optimization by each operator for its own cellular network. That application specifically discusses a concept of local and global optimization for spectrum management according to a specified brokering scheme.

As an aid to the optimization described in the 780 Application, Application No. PCT/US2012/035760 describes inputs, outputs and guidelines of an algorithm used to resolve spectrum optimization at one or both of the global and local spectrum broker levels described in the [0060] Application. Each of the inputs discussed in the 760 Application may be employed to generate appropriate output profiles for multi-mode devices (MMD's), or wireless devices, in support of the DSA. The 760 Application specifically describes implementing a spectrum management analytics (SMA) algorithm that references a plurality of enumerated inputs to generate a set of output parameters for use by an MMD in optimizing spectrum use for the spectrum resources made available to that MMD. The SMA algorithm is described as being a part of a cloud spectrum broker (CSB) analytic. The CSB analytic provides for: (1) Managing CSS transactions involving transfer of spectrum resources from participating PSH's to one or more ASH's; (2) Reclaiming spectrum resources from an ASH back to the corresponding PSH on request; (3) Initiating queries to PSH's based on requests from MMD's, or through other ASH's; and (4) Performing a series of predictive resource allocations that may optimize spectrum use as the MMD moves between a number of regions.

The multiple and varied sources of information generally described in the 760 Application provide information regarding: a radio interface, MMD capabilities, base station capabilities, information from geographic databases, information from a spectrum availability database (such as a CSD), information from an MMD profile database, and information regarding outstanding requests, which may represent a compilation of application characteristics, MMD mobility models, and information on visible networks.

To realize the CSS approach described in the 261 Provisional Application, a cloud spectrum database (CSD) is proposed, with detail provided in related Application No. PCT/US2012/035748, to serve as a dynamic and interactive repository for several of the classes of information discussed in the 760 Application associated with a dynamically changing listing of spectrum availabilities. The systems and methods described in the 748 Application implement the CSD by which spectrum availability is defined and cataloged according to individual data elements and offered for transactions with ASH's and MMD's according to a common unit measurement system. In the 748 Application disclosure, the defined metric for the disclosed common unit measurement system is referred to as a time-frequency unit or TFU. One TFU may be defined, for example, according to a unit of spectrum being available for a specified time, e.g., 1 MHz of spectrum being available for use for 1 second at a given location. Every spectrum resource negotiated in CSS transactions may be represented (transferred) in multiples of TFU's, each TFU representing a contiguous time by frequency tile.

The 748 Application specifies that, in the CSD, spectrum availability may be defined according to a plurality of information entries, including at least a frequency band (band ID), a start frequency and an end frequency. Each entry may also be accompanied by a series of individual parameters that may be used to further describe the spectrum availability in order that an ASH or MMD may make an offer for acquisition of several units of spectrum availability according to the information provided. These individual parameters may include: (1) an indication that the available spectrum is licensed; (2) an indication that the available spectrum is subject to being reclaimed by the PSH that made the spectrum available to the CSD, i.e., subject to pre-emption by the PSH, with appropriate details of the immediacy, for example, of the recall; (3) a start time of the spectrum availability; (4) an end time of the spectrum availability; (5) a maximum power level that the PSH authorizes to use over this available spectrum; (6) a geographic location regarding this available spectrum; (7) a cost (monetary or other consideration) per TFU, or other appropriate unit price, for use of the available spectrum; and (8) an indication of an identity of an ASH or MMD using a particular portion of the available spectrum based on a transaction such that, in a case that a PSH wants to reclaim the spectrum that it made available, but that is in use, the CSD will facilitate contact with the entity to ensure that the entity's ceases operation in that spectrum.

Wireless telecommunications are supported by different frequency bands across the available spectrum. Generally, these bands may be categorized as International Mobile Telecommunication (IMT) bands, which are the bands that are generally exclusively licensed by the operators of mobile wireless networks, such as mobile cellular networks, within which individual MMD's are configured to operate, and non-IMT bands that are otherwise exclusively licensed by other types and categories of entities generally described as PSH's in this disclosure. There is a process within the International Telecommunication Union for deciding and/or designating IMT bands.

Exemplary embodiments of the systems and methods according to this disclosure may facilitate implementation of the DSA approaches discussed above by providing signaling at least between base stations controlled by ASH's and individual MMD's operating in communication with those base stations. This signaling may result in the base station of a particular ASH and the individual MMD's supporting aggregation of both the IMT bands and the non-IMT bands in the individual MMD's when in receipt of access to non-IMT band spectrum that may be provided on a dynamic and temporary basis for access by the ASH's, such as operators of the mobile wireless networks, and the individual MMD's with which the base stations communicate.

Exemplary embodiments may be predicated on a modification of the 3rd Generation Partnership Protocol (3GPP®) Long Term Evolution (LTE®) standard so that non-IMT licensed spectrum may be included in LTE® or LTE-Advanced® multi-band carrier aggregation. This will mean that these 3GPP® protocols may be modified to include reference to aggregation of IMT bands with non-IMT bands, either of which could change dynamically. Signaling between an ASH and between a cloud-based entity such as, for example, a CSD or CSB, and between a base station of an ASH and individual MMD's may be appropriately modified to support the IMT/non-IMT aggregation.

Exemplary embodiments may include one or more of the following functions: (1) Transmitting notice from the ASH via the base station to individual MMD's to use one or more specific dynamic IMT and/or non-IMT bands, either for a pre-specified or open-ended period of time; (2) Transmitting requests from MMD's to the ASH via the base station, or otherwise to a cloud-based entity, such as a CSD or CSB, for bandwidth allocation of dynamic IMT and/or non-IMT bands; (3) Transmitting, by the MMD's, indications of individual MMD radio frequency (RF) and/or other capabilities to the ASH via the base station or to the cloud-based entity, including specifically the capability of an individual MMD to operate in one or more dynamic bands including IMT and/or non-IMT bands; (4) Transmitting notice from the cloud-based entity or ASH via the base station to an individual MMD or plurality of MMD's to cease operating in, using, or transmitting on one or more specific dynamic bands including IMT and/or non-IMT bands, for example, when an indication is received from a PSH that it intends to reclaim its spectrum allocation to its own use.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for facilitating the use of IMT and non-IMT bands by individual MMD's in a spectrum management scheme will be described, in detail, with reference to the following drawings, in which.

DETAILED DESCRIPTION OF THE DISCLOSED EMBODIMENTS

Figure 1:
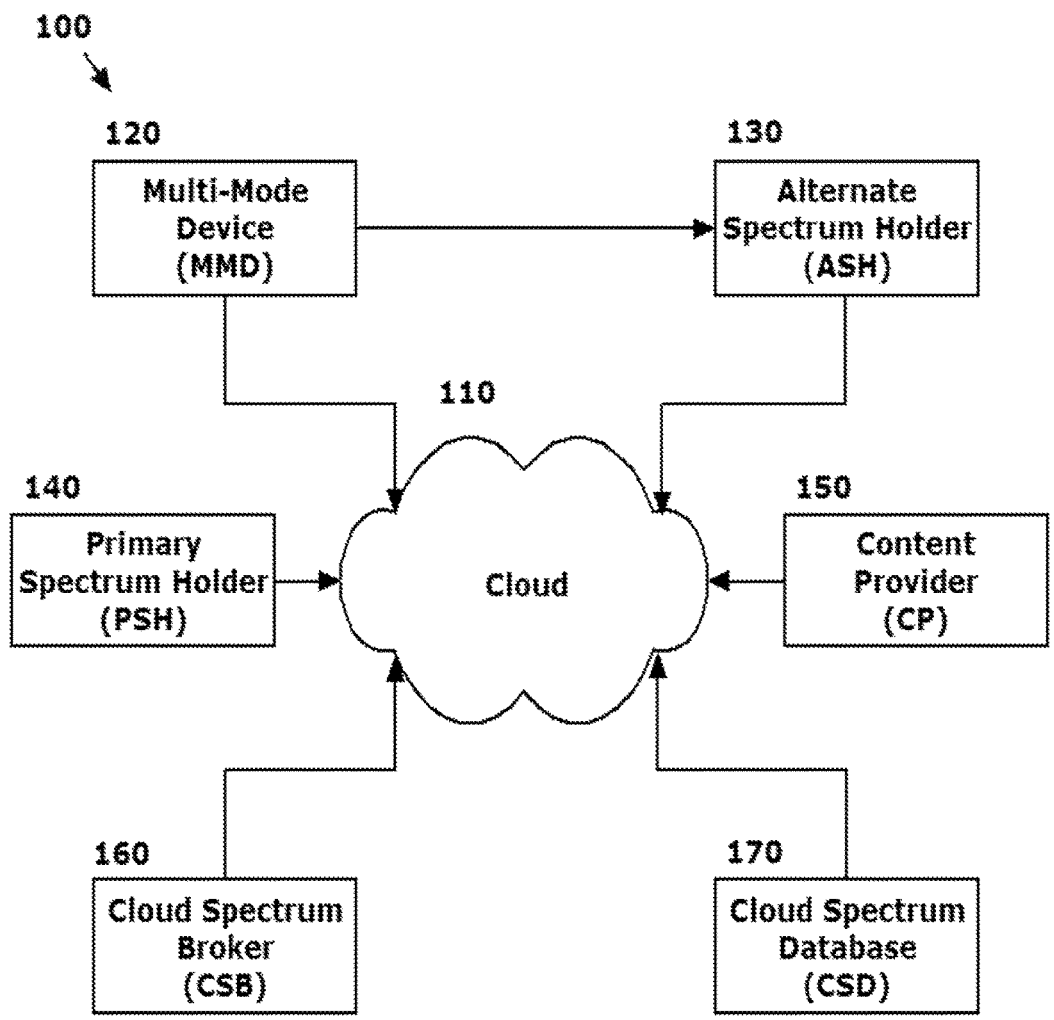
FIG. 1 illustrates an exemplary overview of connectivity to the cloud for individual entities involved in the CSS scheme according to this disclosure.

The systems and methods for facilitating the aggregation of IMT bands and non-IMT bands by individual MMD's in a spectrum management scheme will generally refer to this specific utility for those systems and methods. Exemplary embodiments described and depicted in this disclosure should not be interpreted as being specifically limited to particular communication paths or particular frequency bands, or to specific system infrastructures for exchanging information with PSH's, ASH's or MMD's, except that at least some of the elements of the disclosed systems, and methods for using those systems, are cloud based.

While reference will appear to be directed, throughout this disclosure, to application of the disclosed systems and methods to a conventionally understood "controlled market" method for providing wireless communication services via one or more ASH's, it should be understood that the systems and methods according to this disclosure are not limited to the conventionally understood "controlled market" method. The disclosed systems and methods may be equally applicable to any method for providing wireless communication services through direct interaction with individual MMD's when such a method becomes feasibly implemented for the control of wireless communication. The discussion references application to the "controlled market" method only for familiarity and ease of understanding of the proposed implementation based on the currently-understood protocols for implementing commercial wireless (cellular) communication.

Specific reference to, for example, any particular MMD, wireless device or wireless (mobile cellular) network configuration should be understood as being exemplary only, and not limited, in any manner, to any particular class of MMD's or other wireless devices used in any particular configuration of a wireless network, whether fixed or mobile, or as autonomous units capable of executing transactions for available spectrum directly with cloud-based elements of a system.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements, and combinations of those elements, as particularly pointed out in the appended claims. While specific exemplary implementations are discussed, it should be understood that this is done for illustration purposes only. A person skilled in the relevant art will recognize that other components and configurations may be used without departing from the spirit and scope of the subject matter of this disclosure.

The 780, 760 and 748 Applications explain that review of spectrum use indicates that there are a large number of inputs that may be considered in optimizing spectrum use. These inputs include time-based, location-based and frequency-based parameters. Information collected and stored in a CSI) according to the [0068] is intended to capture a plurality of these parameters to describe spectrum availability in a single location as part of a cloud-based spectrum marketplace. PSH's whose spectrum is underused, or otherwise can be made available, may employ the marketplace to advertise the specific availability of, to dynamically barter for use of, or to passively allow the system to auction off, their spectrum availability by listing time-based, location-based and frequency-based parameters relevant to any of these transactions, as well as to list a proposed unit cost expressed in TFU's or otherwise. With implementation of such a marketplace, PSH's who know how often, how much, and generally at what times, they employ the spectrum exclusively licensed to them, may populate the CSD with information appropriate to catalog their proposed spectrum availability. PSH's may indicate periods when their spectrum is available, in order that potential ASH's as entities that require or desire additional spectrum services, perhaps at specific times in specific locations, may enter into a transaction based on the listed periods of spectrum availability provided to the marketplace via the CSD.

The availability of spectrum to a spectrum marketplace will sometimes be subject to a PSH's ability to reclaim that spectrum on demand, preempting the use of the spectrum by an ASH or MMD. This disclosure will interchangeably refer to such an occurrence as reclaiming or preempting spectrum use. This capacity is part of the system that implements the cloud-based marketplace scheme. This requirement, and the level of uncertainty that it introduces, may also drive the amount of a fee, or other consideration, that the ASH may be willing to offer for the spectrum availability. If, for example, it is more unlikely than likely that the spectrum will need to be reclaimed immediately in, for example, a peak period for operations by the ASH, that spectrum may garner a higher cost per TFU than spectrum that may be immediately recallable and is likely to be recalled on some routine basis.

The CSD and/or the CSB may provide the basis by which the marketplace may oversee transactions regarding available spectrum according to a mechanism incumbent to the CSD, and/or actively undertaken by the CSB, that records, in a manner that may inform at least the PSH, what entity or entities are "renting" available spectrum of the PSH at any particular point in time. This may be appropriate so that the PSH can indicate to a renting ASH, based on information in the CSD and/or via the CSB, a requirement to reclaim the spectrum to the PSH's use.

FIG. 1 illustrates an exemplary overview 100 of connectivity to the cloud 110 for individual entities involved in the CSS architecture. As shown in FIG. 1, the individual entities may include: one or more multi-mode devices (MMD's) 120 communicating directly with other of the entities via the cloud 110, or otherwise through an alternate spectrum holder (ASH) 130 with which the one or more MMD's 120 are in communication; one or more primary spectrum holders (PSH's) 140; one or more content providers (CP's) 150; at least one regional cloud spectrum broker (CSB) 160; and a generally regional cloud spectrum database (CSD) 170. Although depicted as separate elements in FIG. 1, one or more of the elements representing the individual entities 120-170 may actually be resident in the cloud 110. This may be particularly the situation with the CSD 170.

Implementation of the spectrum management schemes discussed above involves exchange of certain data between PSH's and ASH's and/or MMD's. Spectrum accessibility may be exchanged based on requests from ASH's or MMD's, passive supply of parameters by a PSH, or active advertising by a PSH to the marketplace. Spectrum availability may be specified according to a plurality of defining parameters. The defining parameters may include, for example, identification of a frequency band, and/or separate identification of a start frequency and an end frequency, which may be used cooperatively or independently to define the frequency of the spectrum availability provided by the PSH. The provided frequency hand may be one or more non-IMT bands. Typically, MMD's operate only in IMT bands. Conventionally, a capacity exists to aggregate IMT-band communication across multiple IMT bands to the beneficial use of one or more MMD's. A capacity to aggregate non-IMT bands to this use does not exist.

According to disclosed systems and methods, an individual MMD, or an ASH operating a base station with which a number of MMD's operate, may advise the other elements of CSS architecture of its capabilities, in the form of an MMD profile for the individual MMD or multiple MMD's.

This profile information, provided for the consideration of a cloud-based entity, such as a CSB or a CSD to allocate spectrum, or for a PSH to direct its advertising to a targeted market, may include an indication of the capacity of an individual MMD and a base station to support signaling by which the IMT bands may be aggregated with non-IMT bands. In this manner, the capacity of a particular MMD, or group of MMD's, to support specific levels of aggregation may provide appropriate insight to the spectrum marketplace to facilitate optimization of spectrum resources.

The defining parameters may include a number of other fields of information on including a start time and an end time, which taken together specify an "availability window" for the particular spectrum availability. The definition of an availability window will aid an ASH or MMD in determining whether a particular offered spectrum availability meets the requirements of the ASH or MMD. When taken in combination with definition of details regarding potential preemption, the availability window provides a best guess by the PSH regarding its ability to provide uninterrupted spectrum availability.

By defining start times and end times for the TFU's of spectrum availability, the PSH is generally considered to have specified the availability window that allows the PSH to specify when the respective TFU's are available, and more specifically, outside of which when those TFU's are to be vacated by the ASH or MMD. In other words, available TFU entries may become automatically unavailable outside the specified availability windows. The TFU's additionally may be subject to being reclaimed by the offering PSH at any time by, for example, the PSH sending a "STOP" or "STOP <time>" message. The "STOP" or "STOP <time>" message may be the mechanism used by the PSH to reclaim TFU's previously made available to the CSD and/or the CSB when a need arises within a particular availability window. When circumstances arise that require the PSH to reclaim the use of its spectrum, the CSD and/or the CSB may notify the associated ASH or MMD using the procured TFU's to discontinue use of the reclaimed TFU's immediately in the case of a "STOP" message, or no later than the value indicated by the <time> parameter of the "STOP <time> message. The CSD and/or the CSB thereby may cause information to be transmitted to the controlling ASH, or directly to a using MMD, to cease use of the TFU's made available by the PSH.

The defining parameters may include information on a reference location for the spectrum availability. As indicated above, spectrum availability includes at least three components. These are (1) the frequency-based component, (2) the time-based component, and (3) the location-based component.

The defining parameters may include information on a particular cost per spectrum unit, specified in this disclosure with reference to TFU's to provide a common framework for the discussion. It should be understood that other metrics may be used in place of a TFU, and that "cost" may be met according to monetary compensation or other considerations. It should be further understood that individual costs for spectrum availability, measured in TFU's may be predicated on any number of factors by which the PSH may seek to maximize its profits. The PSH may, for example, study usage patterns in a particular geographic location and establish different costs per TFU for different time frames, for different locations, and/or for different frequencies.

Because certain elements of the defining parameters may change very dynamically, each of the entities involved in the transaction communication process described above should be responsive to these dynamic changes in the information provided. An ability to keep pace with the rapidly changing landscape of the marketplace may define a requirement for a fully automated computation engine as a CSB, or to appropriately support and employ the CSI), in a manner that accounts for the dynamically changing conditions regarding any of the specified parameters on a real-time or near real-time basis.

Figure 2:
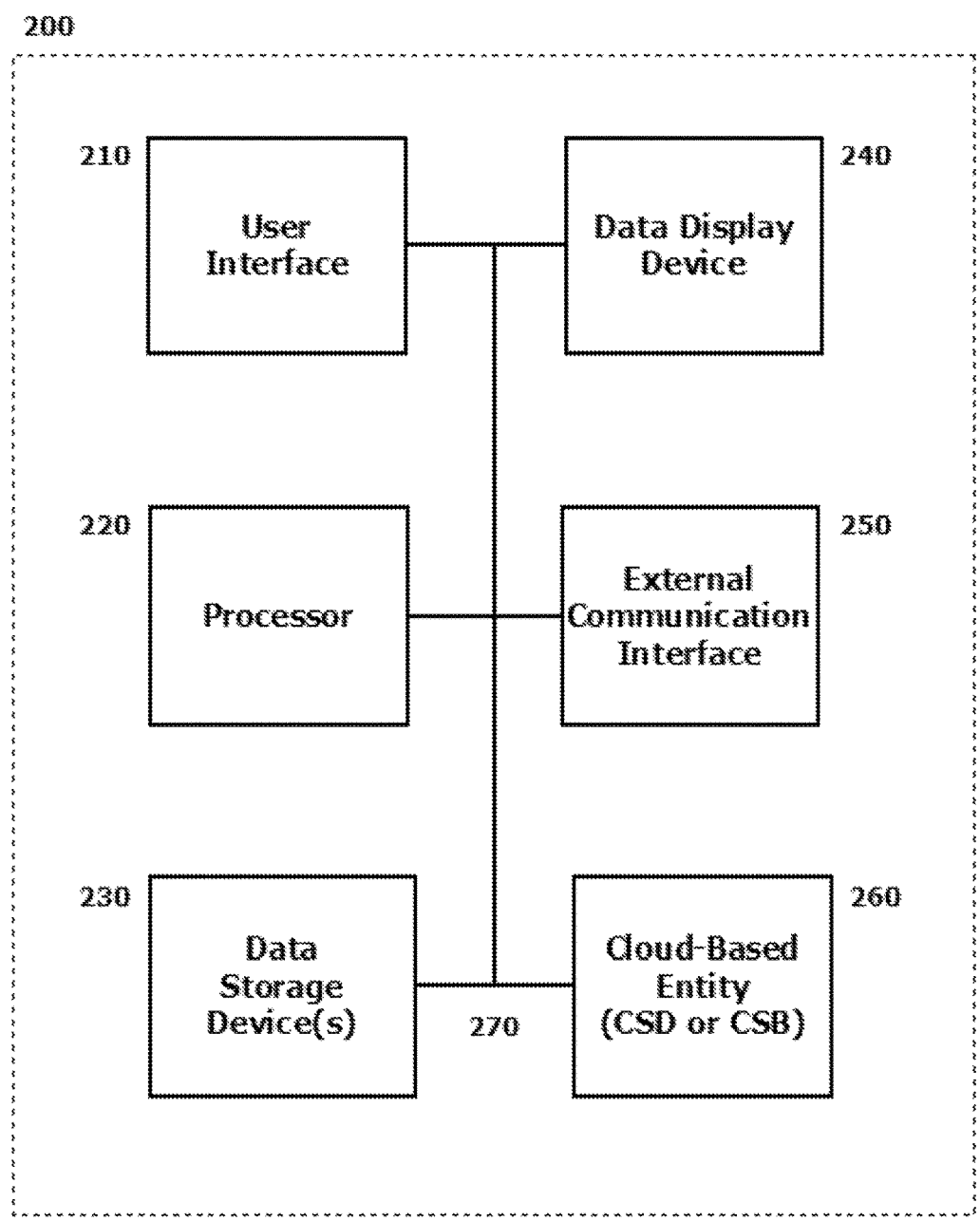
FIG. 2 illustrates a block diagram of an exemplary system for managing connectivity between the different elements of the CSS architecture for aggregating IMT and non-IMT bands according to this disclosure.

FIG. 2 illustrates a block diagram of an exemplary system 200 to manage connectivity between the different elements of the CSS architecture to aggregate IMT and non-IMT band use. The exemplary system 200 is available to facilitate interaction with a cloud-based entity 260 such as, for example, a CSD or a CSB. The exemplary system 200 may assist the cloud-based entity 260 in determining what spectrum may be available in a specific location for a specified period of time and in a particular frequency band, i.e., an IMT band or a non-IMT band, as well as defining what a specific user entity or ASH may have to offer in compensation in order to gain access to TFU's of the available spectrum. The cloud-based entity 260 may facilitate communication of information between all of the individual entities, as shown in FIG. 1, and may manage information provided from, and acts as an interface to, the various entities. The cloud-based entity 260 may provide a vehicle by which information may be provided regarding commonly-represented spectrum availability by managing individual parameters and conditions associated with the spectrum availability, as provided by a PSH, or as requested by an ASH or MMD, according to a profile for base stations and/or individual MMD's. In this regard, the cloud-based entity 260 may provide an appropriately-supported interactive vehicle by which the exemplary system 200 may efficiently facilitate transactions regarding available spectrum provided by individual PSH's, to include a mechanism to return of spectrum to the use of the PSH upon request from the PSH to reclaim that spectrum.

The exemplary system 200 may include a user interface 210 by which an individual or entity tasked with monitoring and/or overseeing interaction with the cloud-based entity 260 may make manual inputs to the exemplary system 200, and may otherwise communicate information via the exemplary system 200 to one or more PSH's, ASH's, MMD's or CP's. The user interface 210 may be configured as one or more conventional mechanisms that permit an individual or entity to input information to the exemplary system 200.

The significant amounts of dynamic information to be exchanged in the disclosed methods to facilitate transactions for the acquisition and use of appropriate multiples of TFU's, as made available to the spectrum availability marketplace by one or more PSH's will likely be dynamic enough that those inputs could not be input via a manual user interface 210. Rather, information from one or more of the several entities shown in, for example, FIG. 1, may be received by the exemplary system 200 as automated inputs through an external communication interface 250, or some other automated channel. This level of automation and data exchange is appropriate to ensure that the exemplary system 200 plays its part in facilitating the transactions regarding spectrum availability in real time, or near real-time, in order to keep pace with the dynamically changing requirements provided by the one or more PSH's, ASH's or MMD's.

The exemplary system 200 may include one or more local processors 220 to individually undertake the processing and control functions to store information in appropriate storage devices such as, for example, data storage devices 230, or a CSD when the cloud-based entity 260 is configured as a CSD or otherwise supports a CSD. Processor(s) 220 may include at least one conventional processor or microprocessor that interprets and executes instructions and processes data, incoming for, and outgoing from, the cloud-based entity 260.

The exemplary system 200 may include one or more data storage devices 230. Such data storage device(s) 230, which may include hard disk storage as well as solid-state devices, may be used to store data, and operating programs or applications to be used by the exemplary system 200, and specifically by the processor(s) 220. Data storage device(s) 230 may include a random access memory (RAM) or another type of dynamic storage device that stores information and instructions for execution by the processor(s) 220. Data storage device(s) 230 may also include a read-only memory (ROM), which may include a conventional ROM device or another type of static storage device that stores static information and instructions for execution by the processor(s) 220. The data storage device(s) 230 may be those that are integral to the exemplary system 200, or otherwise may be remotely located from, and accessible to, the exemplary system 200.

The exemplary system 200 may include at least one data display device 240 by which information regarding the status of any particular transaction, and information received regarding available TFU's, including specifically which bands, i.e., IMT or non-IMT bands, the TFU's may be offered in, may be monitored by an individual user or a user entity tasked with facilitating transactions for TFU's of spectrum availability using the exemplary system 200. The data display device 240 may be configured as one or more conventional mechanisms that display information to individuals or entities interacting with the exemplary system 200 for operation of the exemplary system 200, or otherwise for interacting with the cloud-based entity 260 via the exemplary system 200.

The exemplary system 200 may include at least one external communication interface 250. The external communication interface 250 may incorporate a plurality of individual information exchange interfaces by which the exemplary system 200 may communicate with one or more of the entities shown in FIG. 1 in order to provide support from the exemplary system 200 to the cloud-based entity 260. The external communication interface 250 may incorporate one or more antennas to facilitate the communication. The communication from the enumerated entities may include, for example, (1) obtaining from PSH's indications of available TFU's of spectrum including supported frequency bands, or (2) obtaining from ASH's and MMD's associated with ASH's offers to procure available TFU's of spectrum, including which frequency bands may be supported by a base station controlled by a particular ASH, or by individual MMD's. The exemplary external communication interface 250 may include a capacity to determine an identity of any of the depicted and described entities attempting to interact with the cloud-based entity 260. In this manner, the exemplary external communication interface 250 may act as a form of a gatekeeper to verify authorization, according to known methods, of a particular entity to access the cloud-based entity 260 via the exemplary system 200.

All of the various components of the exemplary system 200, as depicted in FIG. 2, may be connected by one or more data/control busses 270. The data/control bus(ses) 270 may provide internal wired and/or wireless communication between the various components of the exemplary system 200. In a preferred embodiment, the data/control bus(ses) 270 will provide wireless communication to cloud-based components including the cloud-based entity 260. Based on the cloud-based nature of the system architecture, it should be understood that all or some of the components of the exemplary system 200 may be remotely located with respect to each other as actual or virtual logical components of the exemplary system 200. The exemplary system 200, therefore, may provide an appropriate interface/gateway to the individually-enumerated entities shown in FIG. 1, via one or more cloud-based entities 260 supported by the exemplary system 200.

It is anticipated that the various disclosed elements of the exemplary system 200 may be arranged in combinations of sub-systems as individual components or combinations of components, integral to a single unit or remotely dispersed as a plurality of elements or sub-units comprising the exemplary system 200. As indicated above, at least one or more of the components of the exemplary system 200 will be hosted by, or resident in, the cloud.

Figure 3:
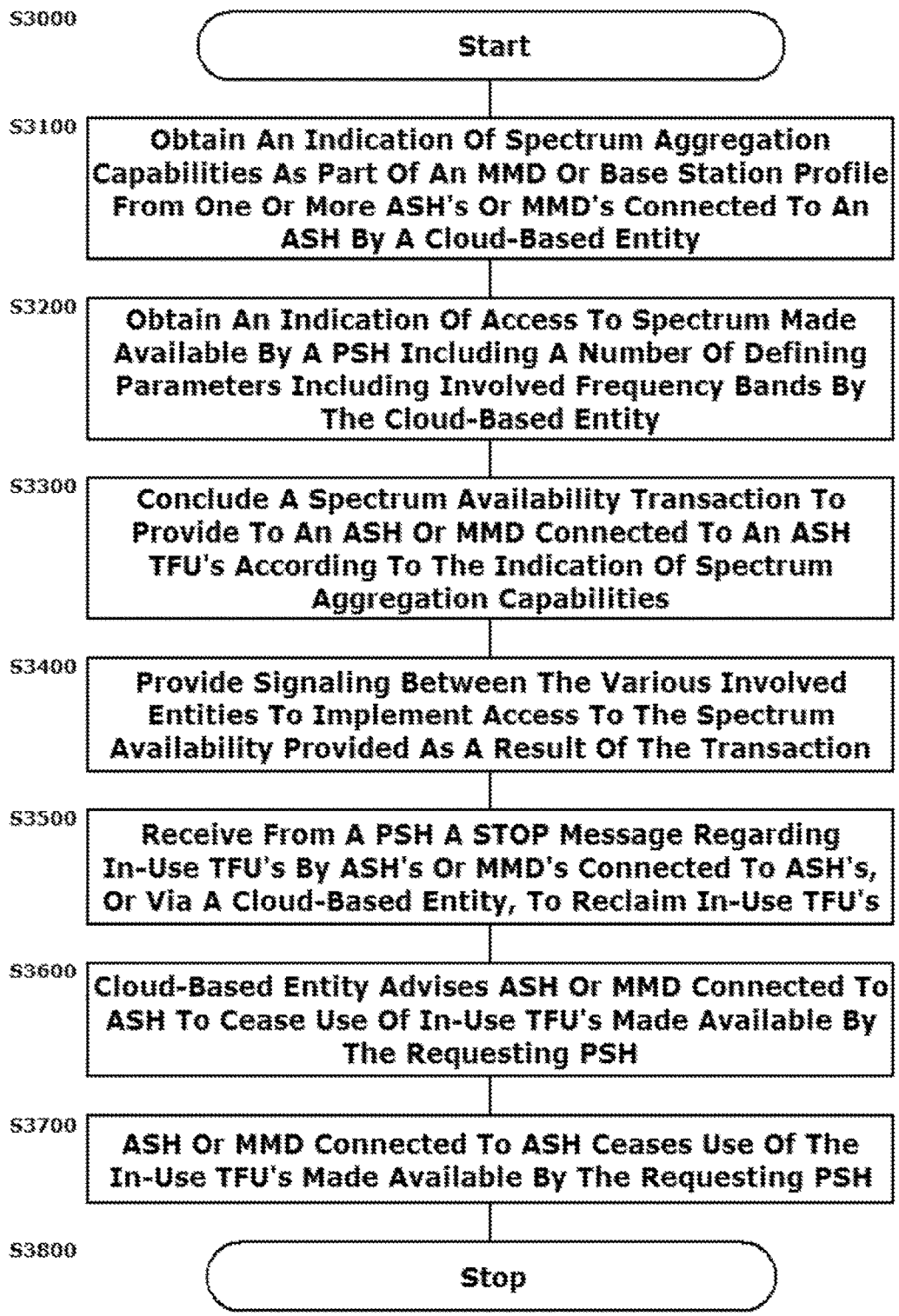
FIG. 3 illustrates a flowchart of an exemplary method for facilitating aggregation of IMT and non-IMT bands between the different elements of the CSS architecture according to this disclosure.

FIG. 3 illustrates a flowchart of an exemplary method to facilitate aggregation of IMT and non-IMT bands between the different elements of the CSS architecture. As shown in FIG. 3, operation the method commences at Step S3000 and proceeds to Step S3100.

In Step S3100, an indication of capabilities for spectrum aggregation by a base station or an MMD may be obtained by a cloud-based entity as part of an MMD profile provided by an MMD or an ASH. This indication may include a capacity by the base station and/or the MMD to aggregate the use of IMT bands, as well as non-IMT bands. Operation of the method proceeds to Step S3200.

In Step S3200, an indication of access to spectrum may be provided by a participating PSH. The PSH may indicate to the spectrum marketplace a number of parameters regarding the spectrum availability including a time, location and frequency band for the spectrum availability. The frequency band may be a non-IMT band. Operation of the method proceeds to Step S3300.

In Step S3300, a spectrum availability transaction may be concluded directly between the participating PSH and one or more ASH's or MMD's, or the transaction may be facilitated by a cloud-based entity, such as a CSD or a CSB. These transactions, whether direct or facilitated, may generally attempt to optimally match requirements for spectrum availability by an ASH or MMD with spectrum made available by one or more PSH's, the spectrum availability being listed as a number of TFU's available for a certain cost, in the form of monetary compensation or other consideration per TFU, and in a particular frequency band based on the obtained capability of the base station and the MMD to support different levels of aggregation including between IMT and non-IMT bands. Operation of the method proceeds to Step S3400.

In Step S3400, signaling may be indicated between various of the involved entities, including PSI's, ASH's, MMD's and a cloud-based entity that takes an active role in the spectrum availability marketplace and transactions, to facilitate spectrum matching for access to frequency bands that the base station and MMD are capable of aggregating. Operation of the method proceeds to Step S3500.

In Step S3500, the participating PSH may send a "STOP" or "STOP <time>" message regarding the in-use TFU's directly to an ASH and/or an MMD using the in-use TFU's, or may send the message via the cloud-based entity, to reclaim the in-use TFU's. The "STOP" or "STOP <time>" message effectively modifies the end time of any availability window that the PSH provided for the TFU's. Operation of the method proceeds to Step S3600.

In Step S3600, when a cloud-based entity is, or has been, involved in the transaction, or the "STOP" or "STOP <time>" message is received via a cloud-based entity, the cloud-based entity may communicate the requirement to reclaim the participating PSH's TFU's to the ASH or MMD. Operation of the method proceeds to Step S3700.

In Step S3700, the ASH or MMD, upon receipt of an indication that the TFU's are to be reclaimed may immediately cease operations involving those TFU's in order that the participating PSH may have full access to its exclusively-licensed spectrum without interference from operations of individual MMD's not under its control. Operation of the method proceeds to Step S3800, where operation of the method ceases.

The disclosed embodiments may include a non-transitory computer-readable medium storing instructions which, when executed by a processor or multiple processors, may cause the processor or multiple processors to execute all or some of the steps of a methods as outlined above.

The above-described exemplary systems and methods reference certain conventional terms and components to provide a brief, general description of a suitable communication and processing environment in which the subject matter of this disclosure, and particularly the disclosed interaction with one or more cloud-based entities, may be implemented for familiarity and ease of understanding. Although not required, embodiments of the systems and methods according to this disclosure may be provided, at least in part, in a form of hardware circuits, firmware or software computer-executable instructions to carry out the specific functions described, including program modules, being executed by a processor or processors. It should also be understood that certain of the functions described above may be carried out by virtual logical elements that may be cloud-based. Generally, program modules include routine programs, objects, components, data structures, and the like that perform particular tasks or implement particular data types.

Those skilled in the art will appreciate that other embodiments of the disclosed subject matter may be practiced with many types of communication equipment and computing system configurations.

Embodiments may be practiced in distributed network and/or cloud-based communication/computing environments where tasks are performed by local and remote processing devices that are linked to each other by hardwired links, wireless links or a combination of both through a communication network. In a distributed network environment, program modules may be located in local, remote and virtual logical cloud-based data storage devices.

Embodiments within the scope of this disclosure may also include non-transitory computer-readable media having stored computer-executable instructions or data structures that can be accessed, read and executed by processors using a compatible physical data reader, or executing an appropriate data reading scheme. Such computer-readable media can be any available media that can be accessed by a processor or processors. By way of example, and not limitation, such computer-readable media can comprise RAM, ROM, EEPROM, CD-ROM, DVD-ROM, flash drives, thumb drives, data memory cards or other analog or digital data storage devices that can be used to carry or store desired program elements or steps in the form of accessible computer-executable instructions or data structures. Combinations of the above should also be included within the scope of the computer-readable media for the purposes of this disclosure.

The exemplary depicted sequences of executable instructions, or associated data structures to execute those instructions, represent only examples of corresponding sequences of acts to implement the functions described in the methods. The steps of the method, as depicted and described, are not intended to imply any particular order to the depicted steps, except as may be necessarily inferred when one of the depicted steps is a necessary precedential condition to accomplishing another of the depicted steps. Many of the operations and functions described may occur in parallel.

Although the above description may contain specific details, they should not be construed as limiting the claims in any way. Other configurations of the described embodiments of the disclosed systems and methods are part of the scope of this disclosure. This enables each user to use the benefits of the disclosure even if any one of a large number of possible applications, for example, being accessed by any particular MMD, do not need a specific aspect of the functionality described and depicted in this disclosure, except as may be used to indicate a capability of aggregation of different frequency bands. In other words, there may be multiple instances of the components, particularly individual MMD's, each processing the content in various possible ways. It does not necessarily need to be one system used by all end users. Accordingly, the appended claims and their legal equivalents should only define the disclosure, rather than any specific examples given.

We claim:

1. A system to implement dynamic spectrum access, comprising:
   an external communication interface that includes at least one antenna and is configured to receive (1) a request for available spectrum in a geographic region, the request indicating an ability of a requestor to aggregate frequency use across a plurality of frequency bands including International Mobile Telecommunication (IMT) bands and non-IMT bands, and (2) an indication of available spectrum in the geographic region, the indication including one or more frequency bands for the available spectrum; and
   a processor that is programmed to
      conclude a spectrum availability transaction to provide a portion of the available spectrum to the requestor according to the ability of the requestor to aggregate frequency use across the plurality of frequency bands; and
      communicate to the requestor information regarding access to the provided portion of the available spectrum;
   the requestor employing the portion of the available spectrum to conduct at least one of wireless voice and data communications, including conducting signaling between various entities to aggregate the frequency use across the plurality of frequency bands including the IMT bands and non-IMT bands.

2. The system of claim 1, the requestor being one of a multi-mode wireless device or a base station associated with a wireless network operator representing a plurality of multi-mode wireless devices.

3. The system of claim 1, the indication of the available spectrum in the region being subject to one or more conditions.

4. The system of claim 3, the one or more conditions including at least a start time and an end time for access to the available spectrum.

5. The system of claim 4, the processor being further programmed to receive a request to reclaim the portion of the available spectrum; and
communicate to the requestor the request to reclaim the portion of the available spectrum,
the requestor ceasing the employing of the portion of the available spectrum for conducting the at least one of the wireless voice and data communications upon receipt of the request to reclaim the portion of the available spectrum.

6. The system of claim 5, the request to reclaim the portion of the available spectrum including a time parameter by which use of the portion of the available spectrum by the requestor is to cease.

7. The system of claim 3, the one or more conditions including cost information represented as a cost per time-frequency unit applied to the available spectrum, the time-frequency unit including a common amount of spectrum and a common time reference for the available spectrum.

8. The system of claim 7, the common amount of spectrum being 1 MHz and the common time reference being 1 second resulting in the cost per time-frequency unit for the available spectrum being based on a rate of 1 MHz-second.

9. The system of claim 7, the request for available spectrum in the geographic region including an indication of what the requestor is willing to pay in monetary compensation or other consideration per time-frequency unit for access to the requested available spectrum.

10. The system of claim 1, the processor being a cloud-based entity.

11. A method to implement dynamic spectrum access, comprising:
receiving a request for available spectrum in a geographic region, the request indicating an ability of a requestor to aggregate frequency use across a plurality of frequency bands including IMT bands and non-IMT bands;
receiving an indication of available spectrum in the geographic region, the indication including one or more frequency bands for the available spectrum;
concluding a spectrum availability transaction to provide a portion of the available spectrum to the requestor according to the ability of the requestor to aggregate frequency use across the plurality of frequency bands; and
employing, by the requestor, the portion of the available spectrum to conduct at least one of wireless voice and data communications, including conducting signaling between various entities to aggregate the frequency use across the plurality of frequency bands including the IMT bands and non-IMT bands,
the receiving of the request for the available spectrum, the receiving of the indication of the available spectrum and the concluding of the spectrum availability transaction being undertaken by a processor.

12. The method of claim 11, the requestor being one of a multi-mode wireless device or a base station associated with a wireless network operator representing a plurality of multi-mode wireless devices.

13. The method of claim 11, the indication of the available spectrum in the region being subject to one or more conditions.

14. The method of claim 13, the one or more conditions including at least a start time and an end time for access to the available spectrum.

15. The method of claim 14, further comprising receiving a request to reclaim the portion of the available spectrum,
the requestor ceasing the employing of the portion of the available spectrum for conducting the at least one of the wireless voice and data communications upon receipt of the request to reclaim the portion of the available spectrum.

16. The method of claim 15, the request to reclaim the portion of the available spectrum including a time parameter by which use of the portion of the available spectrum by the requestor is to cease.

17. The method of claim 13, the one or more conditions including cost information represented as a cost per time-frequency unit applied to the available spectrum, the time-frequency unit including a common amount of spectrum and a common time reference for the available spectrum.

18. The method of claim 17, the common amount of spectrum being 1 MHz and the common time reference being 1 second resulting in the cost per time-frequency unit for the available spectrum being based on a rate of 1 MHz-second.

19. The method of claim 17, the request for available spectrum in the geographic region including an indication of what the requestor is willing to pay in monetary compensation or other consideration per time-frequency unit for access to the requested available spectrum.

20. The method of claim 11, the processor being a cloud-based entity.

21. A non-transitory computer-readable medium storing computer-readable instructions which, when executed by a processor, causes the processor to execute a method to implement dynamic spectrum access, the method comprising:
receiving a request for available spectrum in a geographic region, the request indicating an ability of a requestor to aggregate frequency use across a plurality of frequency bands including IMT bands and non-IMT bands;
receiving an indication of available spectrum in the geographic region, the indication including one or more frequency bands for the available spectrum; and
concluding a spectrum availability transaction to provide a portion of the available spectrum to the requestor according to the indicated ability of the requestor to aggregate frequency use across the plurality of frequency bands,
the portion of the available spectrum being employed by the requestor to conduct at least one of wireless voice and data communications, including conducting signaling between various entities to aggregate the frequency use across the plurality of frequency bands including the IMT bands and non-IMT bands, and
the requestor being one of a multi-mode wireless device or a base station associated with a wireless network operator representing a plurality of multi-mode wireless devices.

22. The non-transitory computer-readable medium of claim 21, the indication of the available spectrum in the region being subject to one or more conditions.

23. The non-transitory computer-readable medium of claim 22, the one or more conditions including at least a start time and an end time for access to the available spectrum.

24. The non-transitory computer-readable medium of claim 23, further comprising receiving a request to reclaim the portion of the available spectrum,
the requestor ceasing the employing of the portion of the available spectrum for conducting the at least one of the wireless voice and data communications upon receipt of the request to reclaim the portion of the available spectrum.

25. The non-transitory computer-readable medium of claim 24, the request to reclaim the portion of the available spectrum including a time parameter by which use of the portion of the available spectrum by the requestor is to cease.

26. The non-transitory computer-readable medium of claim 22, the one or more conditions including cost information represented as a cost per time-frequency unit applied to the available spectrum, the time-frequency unit including a common amount of spectrum and a common time reference for the available spectrum.

27. The non-transitory computer-readable medium of claim 26, the common amount of spectrum being 1 MHz and the common time reference being 1 second resulting in the cost per time-frequency unit for the available spectrum being based on a rate of 1 MHz-second.

28. The non-transitory computer-readable medium of claim 26, the request for available spectrum in the geographic region including an indication of what the requestor is willing to pay in monetary compensation or other consideration per time-frequency unit for access to the requested available spectrum.

29. The non-transitory computer-readable medium of claim 21, the processor being a cloud- based entity.

* * * * *

UNITED STATES PATENT AND TRADEMARK OFFICE
CERTIFICATE OF CORRECTION

PATENT NO. : 10,271,308 B2
APPLICATION NO. : 13/997072
DATED : April 23, 2019
INVENTOR(S) : Geoff Weaver et al.

It is certified that error appears in the above-identified patent and that said Letters Patent is hereby corrected as shown below:

In the Specification

In Column 1, Line 16, Delete "THRD" and insert -- THIRD --, therefor.

In Column 1, Line 21, Delete "COMMUNICATOIN" and insert -- COMMUNICATION --, therefor.

Signed and Sealed this
Fourth Day of June, 2019

Andrei Iancu
*Director of the United States Patent and Trademark Office*